United States Patent
Pfletschinger et al.

(10) Patent No.: US 6,422,540 B1
(45) Date of Patent: Jul. 23, 2002

(54) LEAF SPRING OF COMPOSITE MATERIAL, AND RELATIVE FABRICATION METHOD

(75) Inventors: Elmar Pfletschinger, San Fermo Della Battaglia; Carlo Muzio, Ivrea, both of (IT)

(73) Assignee: Rejna S.p.A., Milan (IT)

( * ) Notice: Subject to any disclaimer, the term of this patent is extended or adjusted under 35 U.S.C. 154(b) by 0 days.

(21) Appl. No.: 09/311,477

(22) Filed: May 13, 1999

(30) Foreign Application Priority Data

May 15, 1998 (IT) ........................................ TO98A0415

(51) Int. Cl.⁷ .............................................. B60G 11/02
(52) U.S. Cl. .......................................... 267/47; 156/185
(58) Field of Search .......................... 267/47, 148, 149; 280/12.4 R, 11.13 L; 264/157, 263; 156/185, 171, 173, 191, 195, 221, 222, 228, 245, 297, 298

(56) References Cited

FOREIGN PATENT DOCUMENTS

| EP | 0005916 | * 8/1979 |
|----|---------|----------|
| EP | 0134617 | 3/1985 |
| EP | 0639725 | 2/1995 |
| FR | 2529839 | 1/1984 |
| JP | 356139921 | * 10/1981 |

OTHER PUBLICATIONS

Derwent Abstract of FR 2529839 dated Jan. 13, 1984.
Derwent Abstract of EP 0639725 dated Feb. 22, 1995.

* cited by examiner

*Primary Examiner*—Christopher P. Schwartz
*Assistant Examiner*—C. T. Bartz
(74) *Attorney, Agent, or Firm*—Ladas & Parry

(57) ABSTRACT

A leaf spring, in particular for automotive suspensions, wherein a central core, e.g. of varying thickness, made of a polymer material having predetermined mechanical characteristics and no reinforcing fibers, is covered on two opposite work surfaces with respective laminates, e.g. of constant thickness, made of composite material. The central core has a longitudinal axis substantially coincident with a neutral axis of the leaf spring; and a predetermined number of transverse holes, by which to fasten the leaf spring to respective mechanical members, are formed through the central core, at the longitudinal axis, without affecting the laminates of composite material.

17 Claims, 1 Drawing Sheet

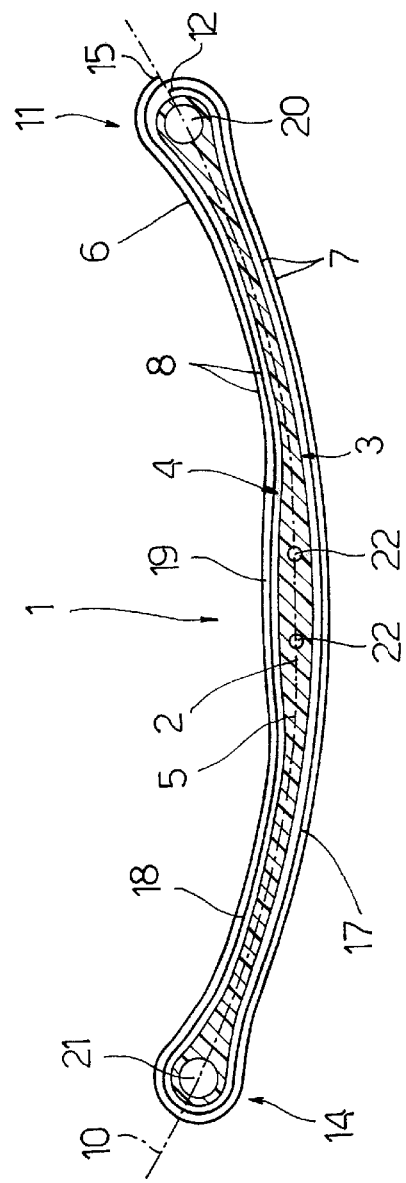
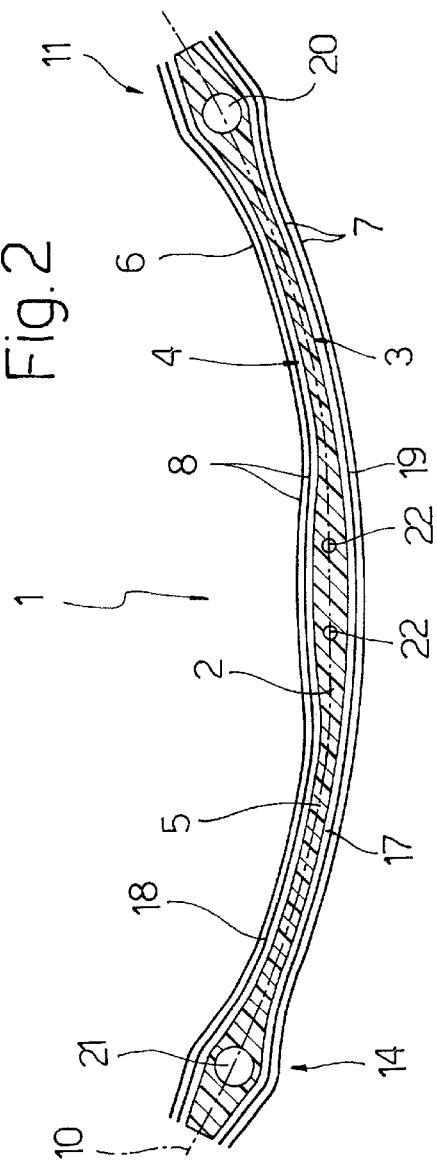

LEAF SPRING OF COMPOSITE MATERIAL, AND RELATIVE FABRICATION METHOD

The present invention relates to a leaf spring, in particular for automotive suspensions, and to a relative fabrication method.

BACKGROUND OF THE INVENTION

Automotive leaf springs are known which are made entirely of composite material, i.e. polymer resin reinforced with appropriate, e.g. glass, fibers, and which, like all items made of composite material, have superior mechanical characteristics and are lightweight as compared with similar conventional, e.g. metal, components.

A further reduction in the weight of leaf springs made of composite material could be achieved by varying the cross section: as is known, leaf springs, in actual use, are not stressed equally along the whole of their length, and only require given particularly thick sections (typically the connecting sections subjected to most stress).

One known method of producing leaf springs of varying thickness, described in Japanese Patent n. 56/139921, provides for winding about a removable frame a continuous strip of fibers preimpregnated with polymer resin, so as to form a number of superimposed layers of preimpregnated fibers: by varying the length of successive windings, it is possible to obtain a manufactured article of maximum thickness at the center, decreasing in thickness towards the ends, and which is then placed inside a mold to set the polymer resin and so obtain the finished article. Though enabling, unlike other known methods, the use of whole fibers along the whole length of the leaf spring (the best working condition for the fibers), the above method nevertheless involves several drawbacks. In particular, leaf springs are formed containing fibers throughout the full thickness, and in particular also along the neutral axis where, as is known, the presence of fibers, as opposed to improving performance of the leaf spring, only serves to increase weight and reduce resistance to shearing stress (which is greatest at the neutral axis, and which, as is known, is not adequately withstood by the fibers). Moreover, any connecting holes (indispensable for connecting the leaf spring to other mechanical vehicle members, unless alternative complex high-cost fastening systems are resorted to) must be formed through the composite material, thus locally interrupting (and so impairing performance of) the fibers, locally increasing stress, and, in other words, significantly reducing resistance precisely at the most highly stressed connecting points.

SUMMARY OF THE INVENTION

It is an object of the present invention to eliminate the aforementioned drawbacks of leaf springs produced using known methods. In particular, it is an object of the invention to provide a leaf spring of superior mechanical characteristics and extremely light weight; it is a further object of the invention to provide a straightforward, low-cost method of fabricating such a leaf spring.

According to the present invention, there is provided a leaf spring, in particular for automotive suspensions, characterized by comprising a central core made of a first polymer material of predetermined mechanical characteristics and having no reinforcing fibers; and at least one cover for covering said central core and made of a composite material in turn comprising a polymer matrix incorporating a number of one-way reinforcing fibers; said central core being of a shape corresponding to the conformation of said leaf spring when undeformed, and being defined by two opposite longitudinal, elastically bendable work surfaces, and by two lateral sides connecting said work surfaces; said at least one cover for covering said central core being located on at least one of said work surfaces of said central core.

The leaf spring according to the invention preferably comprises a predetermined number of transverse holes formed through said central core of polymer material and by which to fasten said leaf spring to respective mechanical members; said transverse holes being formed through said sides of said central core so as not to intersect said at least one cover of composite material.

According to the present invention, there is also provided a method of fabricating a leaf spring of varying cross section, in particular for automotive suspensions, the method being characterized by comprising the steps of:

producing, from a first polymer material of predetermined mechanical characteristics and having no reinforcing fibers, a form elongated longitudinally and defined by two opposite, facing, longitudinal work surfaces, and by two lateral sides connecting the longitudinal said work surfaces; said form having a longitudinal contour substantially coincident with the required contour of said leaf spring when undeformed, and having a longitudinal axis substantially coincident with a neutral axis of said leaf spring;

impregnating a number of one-way, longitudinally aligned reinforcing fibers with a polymer resin in the fluid state to obtain corresponding preimpregnated one-way reinforcing fibers;

placing at least one respective layer of said preimpregnated one-way reinforcing fibers onto each of the two said work surfaces of said form so as to follow the longitudinal contour of the form; said respective layers of said preimpregnated one-way reinforcing fibers being so placed that the reinforcing fibers are substantially parallel to said longitudinal axis of said form;

bringing about a polymerization and/or cross-linking reaction of said polymer resin so that said respective layers of said preimpregnated one-way reinforcing fibers on the two said work surfaces of said form define respective laminates of composite material closely connected to, and reproducing the longitudinal contour of, said form; said form of said first polymer material defining a central core of said leaf spring, of which said respective laminates of composite material define a cover.

This therefore provides for obtaining cheaply and easily a leaf spring of superior mechanical characteristics and extremely light weight : the central core of the leaf spring, located at the neutral axis of the spring, is made easily, even of varying thickness and extremely lightweight from polymer material with no reinforcing fibers; precisely by having no fibers, the central core is of excellent resistance to shearing stress (severest at the neutral axis), especially if made of epoxy resin; and the absence of fibers in this part of the leaf spring not only provides for reducing the overall weight of the spring, but also for improving shear strength and fatigue performance with no negative effect on the mechanical characteristics of the spring. Moreover, while providing for leaf springs of both constant and varying cross section, the method according to the invention is particularly suitable in the latter case: to obtain a leaf spring of varying thickness, in fact, the central core of polymer material— easily shaped using straightforward, low-cost techniques—need simply be of varying thickness, whereas the cover laminates of composite material may advantageously be made of constant thickness, i.e. with no resort to complex processing of the composite material. Clearly, however, the cover laminates of composite material may also be of varying thickness, as would be the case, for example, if the laminates were formed by superimposing successive layers of different lengths.

According to a preferred embodiment of the invention, use is advantageously made of continuous reinforcing fibers, which are only interrupted at the neutral axis of the leaf spring, and which are therefore fully functional. Also for preventing interruption and functional impairment of the reinforcing fibers, the fastening holes of the leaf spring are formed in the central core of resin, and not through the cover layers of composite material.

An epoxy resin is preferably used both for the central core and as a matrix of the composite material of the cover layers: the epoxy resin defining the matrix of the composite material is advantageously polymerized in two stages according to a known technique.

BRIEF DESCRIPTION OF THE DRAWINGS

A number of non-limiting embodiments of the present invention will be described by way of example with reference to the accompanying drawings, in which:

FIG. 1 shows a schematic view of a leaf spring formed in accordance with the invention;

FIG. 2 shows a variation of the FIG. 1 leaf spring.

DETAILED DESCRIPTION OF THE INVENTION

With reference to FIG. 1, the method, according to the invention, of fabricating a leaf spring 1 of varying cross section, in particular for automotive suspensions, provides first of all for producing, from a first polymer material of predetermined mechanical characteristics and having no reinforcing fibers, a form 2 eventually defining, as explained later on, a central core of leaf spring 1. Form 2 is so shaped as to comprise a longitudinal contour corresponding to the required contour of the finished leaf spring 1 when undeformed: in particular, form 2 comprises a longitudinal axis 10 (curved in the example shown) substantially coincident with a neutral axis of leaf spring 1. Though form 2 has a varying cross section in the non-limiting example shown in FIG. 1, the invention obviously also applies to constant-section leaf springs. Form 2 is therefore elongated longitudinally, and is defined by two opposite, curved, elastically bendable work surfaces 3, 4 facing each other and connected by two sides 5 (only one shown in FIG. 1) substantially (though not necessarily) perpendicular, for example, to work surfaces 3, 4. The thickness, measured between the two work surfaces 3, 4, of form 2 varies longitudinally; and form 2 of polymer material may be made using any known technique, e.g. molded, and is preferably made of epoxy resin.

The method according to the invention then provides for impregnating, in substantially known manner, a number of one-way reinforcing fibers, e.g. glass fibers, with a polymer resin in the fluid state (e.g. the same epoxy resin used to make form 2) so as to obtain corresponding preimpregnated one-way reinforcing fibers 6. Respective layers 7, 8 of preimpregnated one-way reinforcing fibers 6 are then placed onto the two work surfaces 3, 4 of form 2 so as to follow the longitudinal contour of the form, and so that the reinforcing fibers are aligned longitudinally with one another and substantially parallel to axis 10 of form 2, i.e. to the neutral axis of leaf spring 1.

In the preferred embodiment shown schematically in FIG. 1, preimpregnated one-way reinforcing fibers 6 define a continuous strip which is wound continuously and longitudinally about form 2: preimpregnated one-way reinforcing fibers 6 are therefore deposited alternately and successively onto the two work surfaces 3, 4 of form 2, so as to follow the longitudinal contour of the form, and are folded at each longitudinal end 11, 14 of form 2 to form layers 7, 8 on respective work surfaces 3, 4. In the example shown, layers 7, 8 are therefore uniform.

The continuous strip of preimpregnated one-way reinforcing fibers 6 may be wound about the form using a known technique, e.g. by rotating form 2 with respect to preimpregnated one-way reinforcing fibers 6, and by pouring the preimpregnated one-way reinforcing fibers inside a channel aligned with work surfaces 3, 4.

Preferably, a predetermined number of longitudinal windings of preimpregnated one-way reinforcing fibers 6 are made about form 2 to form corresponding superimposed layers. As shown in FIG. 1, continuous winding of preimpregnated one-way reinforcing fibers 6 about form 2 commences at a first longitudinal end 11 of form 2, by placing a first end 12 of the strip of preimpregnated one-way reinforcing fibers 6 at axis 10 of form 2, which, once leaf spring 1 is completed, defines the neutral axis of the leaf spring. Once deposited onto work surface 3 of form 2, preimpregnated one-way reinforcing fibers 6 are folded about a second longitudinal end 14, opposite end 11, of form 2, and then deposited onto work surface 4 and back to the starting longitudinal end 11. Upon completion of the predetermined number of longitudinal windings about form 2, winding is interrupted at the starting longitudinal end 11, of form 2, e.g. by cutting preimpregnated one-way reinforcing fibers 6, so that a second end 15 of the strip of preimpregnated one-way reinforcing fibers 6 is also located at longitudinal end 11 and at axis 10.

Using the winding method described above, the continuous one-way reinforcing fibers are wound longitudinally about form 2 and folded, but not interrupted, at longitudinal ends 11, 14 of form 2: the fibers are only interrupted at axis 10, corresponding to the neutral axis of leaf spring 1, at the start and end points of the winding.

The method according to the invention then provides for bringing about a polymerization and/or cross-linking reaction of the polymer resin with which the reinforcing fibers are impregnated, so that the layers 7, 8 of preimpregnated one-way reinforcing fibers 6 on the two work surfaces 3, 4 of form 2 define respective laminates 17, 18 of composite material—of constant thickness in the example shown—connected closely to, and reproducing the longitudinal contour of, form 2. As such, form 2, made of any shape from polymer material with no reinforcing fibers, defines a central core of leaf spring 1, of which laminates 17, 18 of composite material define a constant-thickness cover 19.

The method according to the invention also provides for forming a predetermined number of transverse holes 20, 21, 22 through form 2 of polymer material—namely through sides 5 of the form—to enable leaf spring 1 to, be fitted in known manner (possibly with the insertion of bushes) to respective mechanical members: in the example shown, leaf spring 1 is provided, by simply drilling form 2 of polymer material, with two eyelets 20, 21 at respective longitudinal ends 11, 14 of form 2, and with a pair of central holes 22.

Eyelets 20, 21 and central holes 22 are all formed in form 2 of leaf spring 1, e.g. at axis 10, so as not to intersect cover 19 of composite material; and transverse holes 20, 21, 22 may obviously be formed before or after depositing preimpregnated one-way reinforcing fibers 6 onto form 2.

Though not shown in FIG. 1 for the sake of simplicity, the method according to the invention may also comprise a further step in which respective cover layers—made of polymer material (e.g. again an epoxy resin) and having no reinforcing fibers—are deposited onto layers 7, 8 of preimpregnated one-way reinforcing fibers 6, which are thus located between varying-thickness form 2 and the cover layers; and a further cross-linking/polymerization reaction provides for connecting the cover layers closely to the underlying laminates 17, 18 of composite material.

In the variation shown schematically in FIG. 2, in which any details similar or identical to those already described are indicated using the same reference numbers, layers 7, 8 of preimpregnated one-way reinforcing fibers 6 deposited onto work surfaces 3, 4 of varying-thickness form 2 are distinct, separate layers: in this case, layers 7, 8 of preimpregnated one-way reinforcing fibers 6 are prepared to the appropriate size before being deposited separately onto respective work surfaces 3, 4 to form corresponding laminates 17, 18 covering substantially the whole longitudinal extension of work surfaces 3, 4.

In this case also, a number of layers 7, 8 of preimpregnated one-way reinforcing fibers 6 are preferably deposited successively one on top of the other onto respective work surfaces 3, 4 to obtain a predetermined total thickness of corresponding laminates 17, 18, which may, of course, be of varying thickness if formed, for example, by superimposing respective layers 7, 8 of different lengths.

In this variation, layers 7, 8 of preimpregnated one-way reinforcing fibers 6 deposited onto work surfaces 3, 4 of form 2 are compressed in a mold prior to polymerization/cross-linking of the polymer resin. And, in this case also, the reinforcing fibers in each of layers 7, 8 of preimpregnated one-way reinforcing fibers 6 are continuous and only interrupted at the respective ends at longitudinal ends 11, 14 of form 2.

Clearly, further changes may be made to the method and leaf spring according to the invention and as described herein without, however, departing from the scope of the accompanying Claims. In particular, laminates 17, 18 (each of constant or varying thickness) covering respective work surfaces 3, 4 of form 2 may obviously differ in thickness with respect to each other; and provision may possibly also be made for depositing a cover of preimpregnated reinforcing fibers 6 onto only one of work surfaces 3, 4.

What is claimed is:

1. A leaf spring (1), characterized by comprising:
    a central core (2) made of a first polymer material of predetermined mechanical characteristics and having no reinforcing fibers, said central core (2) being of a shape corresponding to said leaf spring (1) when undeformed, and being defined by two opposite longitudinal, elastically bendable work surfaces (3, 4), and by two lateral sides (5) connecting said work surfaces (3, 4);
    at least one cover (19) for covering said central core (2) and made of a composite material comprising a polymer matrix incorporating a number of one-way reinforcing fibers, said at least one cover (19) for covering said central core (2) being located on at least one of said work surfaces (3, 4) of said central core (2); and
    a predetermined number of transverse holes (20, 21, 22) formed through said central core (2) of polymer material and by which to fasten said leaf spring (1) to respective mechanical members, said transverse holes (20, 21, 22) being formed through said sides (5) of said central core (2) so as not to intersect said at least one cover (19) of composite material.

2. A leaf spring as claimed in claim 1, characterized in that said first polymer material from which said central core (2) is made, and said polymer matrix of said composite material are epoxy resins.

3. A leaf spring as claimed in claim 1, characterized by having, in use, a neutral axis substantially coincident with a straight or curved longitudinal axis (10) of said central core (2); and in that said one-way reinforcing fibers are arranged, in said at least one cover (19), aligned longitudinally with one another and substantially parallel to said neutral axis (10); said leaf spring (1) having substantially no said one-way reinforcing fibers at said neutral axis (10), which substantially lies in said central core (2).

4. A leaf spring as claimed in claim 1, characterized in that said at least one cover (19) covers both said work surfaces (3, 4) of said central core (2), and defines, on the work surfaces, respective laminates (17, 18) of composite material, each of which is connected closely to, and reproduces the longitudinal contour of, said central core (2); said laminates (17, 18) of composite material each comprising one or more superimposed layers of said one-way reinforcing fibers, incorporated in said polymer matrix.

5. A leaf spring as claimed in claim 3, characterized in that said at least one cover (19) of composite material is a continuous cover of constant thickness wound longitudinally about said central core (2); said one-way reinforcing fibers being continuous fibers wound longitudinally about said central core (2), and being folded, but not interrupted, at each longitudinal end (11, 14) of said central core (2).

6. A leaf spring as claimed in claim 5, characterized in that the continuous said one-way reinforcing fibers wound about said central core (2) have respective ends (12, 15) located at said neutral axis (10) of said leaf spring (1) at the same longitudinal end (11) of said central core (2).

7. A leaf spring as claimed in claim 4, characterized in that said respective laminates (17, 18) of composite material defined on the two said work surfaces (3, 4) of said central core (2) by said at least one cover (19) are two distinct laminates, the one-way reinforcing fibers of which are separate from one another; said one-way reinforcing fibers being interrupted at each longitudinal end (11, 14) of said central core (2).

8. A leaf spring as claimed in claim 1, characterized in that said central core (2) has a varying cross section; said work surfaces (3, 4) being curved surfaces facing each other and connected to each other by the two said sides (5); the thickness, measured between the two curved said work surfaces (3, 4), varying longitudinally.

9. A leaf spring as claimed in claim 1, characterized in that said at least one cover (19) of composite material comprises a number of superimposed layers (7, 8) of composite material connected closely to one another and each having a respective number of said one-way reinforcing fibers.

10. A leaf spring as claimed in claim 1, characterized by also comprising, over a constant-thickness said at least one cover (19) of composite material, at least one cover layer made of a second polymer material having no reinforcing fibers.

11. A method of fabricating a leaf spring (1), the method being characterized by comprising the steps of:

producing, from a first polymer material of predetermined mechanical characteristics and having no reinforcing fibers, a form (2) elongated longitudinally and defined by two opposite, facing longitudinal work surfaces (3, 4), and by two lateral sides (5) connecting said longitudinal work surfaces (3, 4), said form (2) having a longitudinal contour substantially coincident with the required contour of said leaf spring (1) when undeformed, and having a longitudinal axis (10) substantially coincident with a neutral axis of said leaf spring (1);

impregnating a number of one-way, longitudinally aligned reinforcing fibers with a polymer resin in the fluid state to obtain corresponding preimpregnated one-way reinforcing fibers (6);

placing at least one respective layer (7, 8) of said preimpregnated one-way reinforcing fibers (6) onto each of said longitudinal work surfaces (3, 4) of said form (2) so as to follow the longitudinal contour of the form, said respective layers (7, 8) of said preimpregnated one-way reinforcing fibers (6) being so placed that the reinforcing fibers are substantially parallel to said longitudinal axis (10) of said form (2), bringing about at least one of a polymerization and a cross-linking reaction of said polymer resin so that said respective layers (7, 8) of said preimpregnated one-way reinforcing fibers (6) on the two said work surfaces (3, 4) of said form (2) define respective laminates (17, 18) of composite material closely connected to, and reproducing the longitudinal contour of, said form (2), wherein said form (2) of said first polymer material defines a central core of said leaf spring (1), of which said respective laminates (17, 18) of composite material define a cover (19); and forming through said form (2) of said first polymer material a predetermined number of transverse holes (20, 21, 22) by which to fasten said leaf spring (1) to respective mechanical members, said transverse holes (20, 21, 22) being formed through said sides (5) of said form without perforating said laminates (17, 18) of composite material.

12. A method as claimed in claim 11, characterized in that said preimpregnated one-way reinforcing fibers (6) define a continuous strip which, in the course of said step of placing said respective layers (7, 8) of said preimpregnated one-way reinforcing fibers (6) onto said work surfaces (3, 4) of said form (2), is wound continuously and longitudinally about said form (2); said preimpregnated one-way reinforcing fibers (6) being deposited alternately and successively onto a first (3) and a second (4) of the two said work surfaces of said form (2) so as to follow the longitudinal contour of the form, and being folded at respective longitudinal ends (11, 14) of said form (2) to form uniform respective layers (7, 8) on each of the two said work surfaces (3, 4).

13. A method as claimed in claim 12, characterized in that, in the course of said step of continuously winding said preimpregnated one-way reinforcing fibers (6) about said form (2), a predetermined number of longitudinal windings of said continuous strip of preimpregnated one-way reinforcing fibers (6) are made about said form (2) to form a number of corresponding superimposed uniform layers (7, 8) of said preimpregnated one-way reinforcing fibers (6).

14. A method as claimed in claim 13, characterized in that continuous winding of said preimpregnated one-way reinforcing fibers (6) about said form (2) is commenced at a first longitudinal end (11) of said form, at said neutral axis (10) of said leaf spring (1), and is interrupted, upon completion of said predetermined number of longitudinal windings about said form (2), at the same said first longitudinal end (11) of said form, again at said neutral axis (10), by cutting said continuous strip of said preimpregnated one-way reinforcing fibers (6).

15. A method as claimed in claim 11, characterized in that said respective layers (7, 8) of said preimpregnated one-way reinforcing fibers (6) deposited onto said work surfaces (3, 4) of said form (2) are distinct, separate layers, which are cut beforehand to predetermined size and then deposited onto said work surfaces (3, 4) to cover substantially the whole longitudinal extension of the work surfaces.

16. A method as claimed in claim 15, characterized in that a number of said layers (7, 8) of said preimpregnated one-way reinforcing fibers (6) are deposited successively, one on top of the other, onto each of the two said work surfaces (3, 4) of said form (2).

17. A method as claimed in claim 11, characterized by also comprising a step in which said layers (7, 8) of said preimpregnated one-way reinforcing fibers (6) deposited onto said work surfaces (3, 4) of said form (2) are compressed in a mold.

* * * * *